Figure 1:
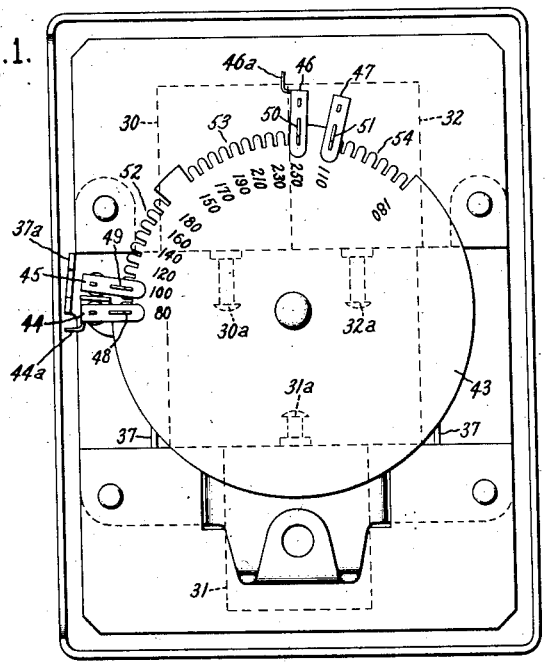

March 27, 1945.                G. M. HAUSLER                2,372,491
                         CONDITION RESPONSIVE CONTROL
                            Filed July 16, 1942            2 Sheets-Sheet 1

Inventor:
George M. Hausler,
by Henry E. Dunham
His Attorney.

March 27, 1945.  G. M. HAUSLER  2,372,491
CONDITION RESPONSIVE CONTROL
Filed July 16, 1942  2 Sheets-Sheet 2
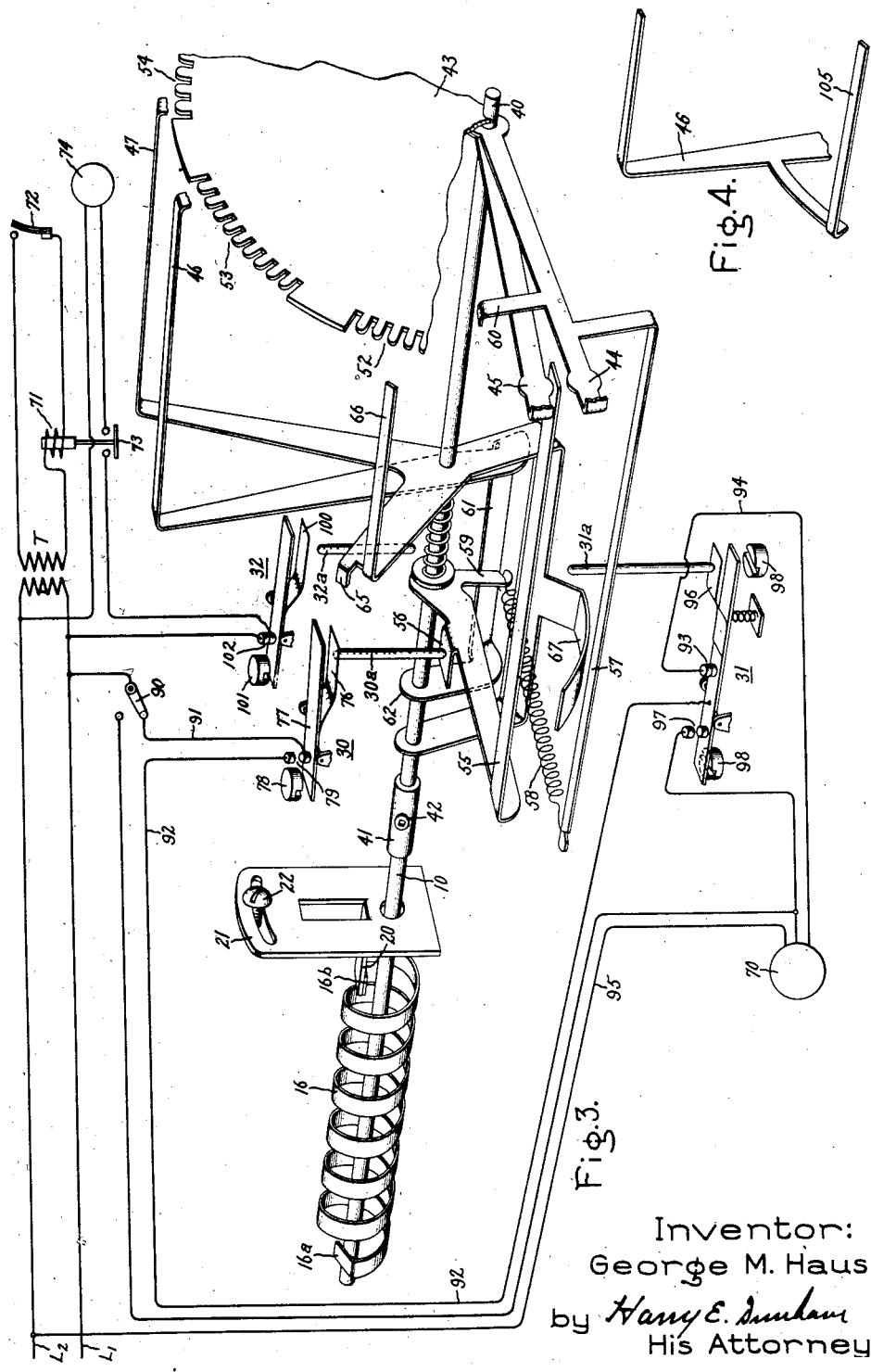
Inventor:
George M. Hausler,
by Harry E. Dunham
His Attorney.

Patented Mar. 27, 1945

2,372,491

UNITED STATES PATENT OFFICE 2,372,491

CONDITION RESPONSIVE CONTROL

George M. Hausler, Ballston Lake, N. Y., assignor to General Electric Company, a corporation of New York Application July 16, 1942, Serial No. 451,130

12 Claims. (Cl. 200—138)

The invention relates to condition responsive control systems and apparatus, and particularly to an automatic sequencing control for condition changing apparatus wherein a plurality of control elements are selectively adjustable in calibration for operation in reverse sequence as a controlling condition varies oppositely through a widely variable range.

The principal object is to provide improved separately adjustable, direct reading, unified driving and calibrating connections between the several control elements and a condition responsive operator therefor that will enable each of the control operations to be effected at will within widely variable selected portions of the total range of the operator to meet widely varying service conditions.

A further object is to limit the selective adjustment of the unified driving and calibrating connections in such a way as to insure that a desired predetermined reversible sequence of control operations is always maintained even though the calibrating adjustment ranges for the several control elements are overlapping.

Another object is to increase the sensitivity and accuracy of control by providing a unified rotary driving and calibrating dial having range limit stops coupled with a pair of concentrically rotatable, axially convergent, angularly adjustable radial plates, each separately driven by the dial for operating a corresponding one of a pair of parallel sliding control elements adjacent the corresponding limit, and also having a relatively adjustable cantilever cam rotating concentrically with the pair of convergent radial plates and driven separately by the dial for sequentially operating another parallel sliding control element intermediate the limits of the control range.

A still further object is to provide improved direct reading adjustable means for varying the differential of operation of one of the control elements involved in the sequence.

Although not necessarily limited thereto, the improvements of the present invention are of particular advantage in an automatic warm air furnace temperature responsive control employing a plurality of endwise sliding pin operated snap action differential switch units for effecting the starting and stopping of a two-speed electric motor driven warm air blower, the shifting between low and high speed of the blower, the opening and closing of a burner safety limit switch in reversible sequence in response to opposite variations in the furnace air temperature through a variable operating range. To meet successfully the widely varying operating conditions encountered in house heating service, it is desirable that the differential in furnace air temperatures required to start and stop the blower be adjustable over a relatively wide range and that both the blower starting and stopping operations be adjustable over an even wider range of furnace air temperatures; also that the furnace air temperature required for shifting between low and high blower speed be adjustable over a relatively wide range that overlaps the motor starting and stopping range, and in addition that the opening and closing of the burner safety limit switch be adjustable to occur over an even wider range of furnace air temperatures that overlaps both the blower motor starting and stopping range and the motor speed change range. Furthermore, it is essential that the reversible sequence of snap action differential operation of all three of the warm air furnace control elements be maintained even though each is selectively adjustable within overlapping temperature ranges.

It is therefore one of the special objects of the present invention to provide an improved sequentially operated warm air furnace blower and limit snap action differential switch mechanism having a calibrating dial reversely rotated in accordance with opposite temperature variations and a plurality of separately adjustable lever arms coaxially mounted in nested abutting sliding relation and separately interlocked with the calibrating dial so as to be capable of easy and accurate adjustment to accomplish the above results. It should be understood, however, that the improvements of the present invention are not necessarily limited to warm air furnace control but may be employed in other condition responsive control systems if desired.

Figure 2:
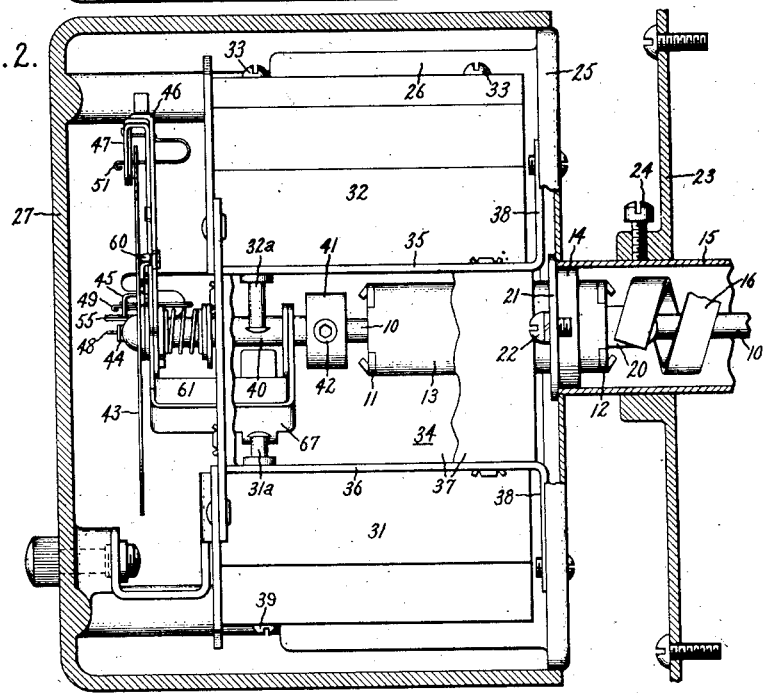

A preferred embodiment of the invention is illustrated in the accompanying drawings in which Fig. 1 is a front view with the cover removed of a warm air furnace blower and limit control switch mechanism provided with the improved selectively adjustable separately interlocked calibrated connections for driving the sequential switch operating mechanism in accordance with variations in the furnace air temperature; Fig. 2 is a sectional view with the cover applied to the switch shown in Fig. 1 revealing more clearly the details of the internal construction; Fig. 3 is a schematic exploded view of the warm air furnace fan and limit switch construccuit diagram of a typical warm air furnace control system; and Fig. 4 shows a modification of one of the operating levers of the mechanism shown in Fig. 3 that may be employed where two-speed warm air blower operation is not desired.

In the improved condition responsive sequencing control apparatus of the present invention, the main operating shaft 10, as shown in Fig. 2, is rotatably mounted in suitable bearing plates 11 and 12 fixed in the ends of the adjustable bearing sleeve 13 that in turn is rotatably mounted by means of the collar 14 in the coaxial main mounting tube 15 within which the condition responsive operating element 16, in the form of an elongated bi-metal helix, is mounted. For the sake of clearness, the mounting tubes 13 and 15 have been omitted from the schematic exploded view of Fig. 3. One end 16a of the bi-metal helix 16 is bent inwardly so as to be fixedly secured, as by welding, to the end of the main operating shaft 10. The other end 16b likewise is bent inwardly so as to be fixedly secured to the finger 20 extending from the collar 14 to which the adjusting plate 21 is fixedly secured. Thus, by angularly adjusting the plate 21, the angular position of the helical bi-metal operating element 16 may be varied to provide an initial calibrating adjustment of the oscillating range thereof. The plate 21 is held in its initial calibrating position by means of a clamping screw 22.

The main mounting tube 15 is slidable through a fixed mounting plate 23 having the clamping screw 24 so that the tube 15 which preferably is perforated adjacent its inner end, can be inserted within the furnace bonnet or warm air duct of the furnace to render the helical bi-metal operating element 16 responsive to variations in the temperature of the heated air leaving the furnace. The main mounting tube 15 carries the back plate 25, preferably having a side plate 26 provided with suitable knock-out conduit openings (not shown) for receiving the connecting wiring conduits for the circuits controlled by the switch mechanism. A removable enclosing cover 27 is preferably formed of molded insulating material to engage with the edges of the back plate 25 and of the side knock-out plate 26 so as to provide a dust-tight enclosure for the control switch mechanism.

A plurality of control switch units comprising the fan starting and stopping switch unit 30, the fan speed changing switch unit 31, and the furnace safety limit switch 32 are disposed about the main operating shaft 10. Preferably, these switch units are of the improved magnetic snap action type fully described and claimed in Patent No. 2,289,973, filed July 22, 1941, by John E. Lake and assigned to the assignee of the present invention, although other forms of snap action switch units may be employed if desired. The switch units 30 and 32 are of the completely enclosed, single pole, single throw type having the endwise sliding or reciprocating operating pins 30a and 32a extending outside the enclosing casing. The switch unit 31 is of the completely enclosed, single pole, double throw type with the endwise sliding or reciprocating operating pin 31a extending outside the enclosing casing. The two switch units 30 and 32 are mounted in side-by-side alignment by means of holding down screws 33 on top of an open end rectangular mounting box 34 having the top and bottom walls 35, 36 and the side walls 37 and provided with the bent-over lugs 38 for removably securing the mounting box 34 to the back plate 25 with the operating shaft 10 and tube 13 extending inside the open end box 34. The switch unit 31 is mounted in parallel opposing alignment with units 30 and 32 on the bottom wall of the box 34 by means of the holding down screw 39. The alignment of the switch units is such that the operating pins 30a, 31a and 32a thereof can extend through suitable openings into the interior of the mounting box 34 to reciprocate in paths that are in parallel alignment in the same plane perpendicular to the axis of shaft 10, as shown in Figs. 1 and 2, with the path of pin 31a offset substantially midway between the parallel paths of pins 30a and 32a and in radial alignment with the axis of shaft 10.

The improved selective separately interlocked calibrating connections for enabling the oscillation of the main operating shaft 10 over a variable range to effect operation of the switch units 30, 31, 32 within widely variable selected portions of the total range of operation of the spiral bi-metal element 16 are assembled as a unit on the stub shaft 40 which is joined to the main operating shaft 10 by the shaft coupling 41 held in position by the set screw 42 and comprise the unified driving and calibrating dial or disc 43 and the cooperating axially bent operating arms 44, 45, 46, and 47, all of which are rotatably mounted upon the shaft extension 40 in nested abutting sliding relation so as to be selectively adjustable into a plurality of angular operating relations. Each of the operating arms 44, 45, 46, and 47 has one end thereof bent over axially to form a yoke provided with a radially extending slot within which the adjustable spring driving pins 48, 49, 50, and 51 are mounted so as selectively to mesh with the different predetermined ranges of driving teeth 52, 53, and 54 formed in the periphery of the calibrating dial 43 and thereby separately interlock each of the several operating arms in selective adjustable calibrated positive driving engagement with the calibrating dial 43 that is fixed upon the end of the stub shaft 40. Thus, as shown in Fig. 1, the adjustment of the two lever arms 44 and 45 is limited within range 52 while the adjustment of lever arm 50 is limited within range 53 and lever arm 47 within range 54.

As shown more clearly in the exploded view of Fig. 3, the two operating arms 44, 45 cooperate with the differential lever 55 that is rotatably mounted on the shaft extension 40 and is provided with the axially bent over finger or radial plate 56 for engaging the operating pin 30a of the switch unit 30. The arm 44 is provided with an axial extension 57 for carrying one end of the biasing spring 58 that has the other end thereof secured to the radial extension 59 of the differential lever 55. Thus spring 58 serves to bias the finger 56 of lever 55 into engagement with the switch operating pin 30a. This floating mounting arrangement of the biasing spring 58 provides a substantially constant biasing force on the differential lever 55 irrespective of the adjustment of the operating arm 44. The operating arm 44 also carries the axially bent over limit finger 60 for limiting the maximum angular separation of the two operating arms 44, 45.

The operating arm 46 is provided with an axially bent over plate portion 61, preferably having the radial supporting arm 62 at the end thereof rotatably supported on the shaft extension 40 so as to carry the radial plate portion 61 into engagement with the operating pin 32a of the switch unit 32 upon an angular movement of the calibrating dial 43 dependent upon the adjustment of the driving spring 50 to engage a selected one of the peripheral teeth in range 53.

Each of the pair of switch operating plates 56 and 61 is shown as extending radially from the shaft 40. Thus these radial plates are axially convergent and are carried by the arms 55 and 46 in concentric paths to provide for both dihedral angular adjustment thereof and joint angular movement thereof about the axis of the driving disc 43. Since these plates have separately calibrated driving couplings with the driving disc 43, each plate can be separately adjusted to vary the oscillation range of the disc 43 required to carry the variably convergent plates into separate engagement with the endwise sliding switch operating pins 30a and 32a.

As indicated in Figs. 1 and 3, the endwise sliding switch operating pins 30a and 32a are disposed in parallel alignment in a plane perpendicularly to the axis of disc 43 and on opposite sides of this axis. Hence each pin will always remain substantially normal to the corresponding one of the axially convergent operating plates throughout the relatively short operating engagement therebetween adjacent the limits of the control range, thereby increasing the sensitivity and accuracy in effecting operation of the control switches 30 and 32 at the calibrated temperature values determined by the adjustable coupling of the operating plates with the driving disc 43. Due to the free oscillation of these convergent plates 56 and 61 with the driving and calibrating disc 43 within the control range, a sensitive and accurate sequential operation of control switch 31 by the cantilever cam 67 carried by the lever arm 47 also can be obtained intermediate the limits of this range.

The operating arm 47, as shown, is of a special Y shape having the axially bent over finger 65 engageable with the abutting operating arm 46 to limit the relative angular movement therebetween and the axially bent over finger 66 engageable with the abutting operating arm 45 to limit the relative angular movement therebetween. In this way the axially extending fingers 66, 65, and 66 serve to limit the relative angular movement of all the nested abutting operating arms so as to insure that a predetermined sequence of operation of the switch units 30, 31, 32 is always obtained even though the temperature adjustment ranges 52, 53 and 54 of the operating arms are overlapping. The operating arm 47 carries a special cantilever cam-shaped extension 67 that rotates in a path concentric with but outwardly of the paths of each of the rotatable convergent plates 56 and 61 and engages with the operating pin 31a of the switch unit 31 after the radial plate 56 has disengaged the switch operating pin 30a and before the radial plate 61 has engaged with the switch operating pin 32a so as to operate this double pole switch from one of its control positions to the other and then maintain the switch in the other position during continued angular movement of the calibrating dial 43.

Operation

With the switch units 30 and 31 connected to control the operation of a two-speed warm air blower driving motor 70 and the switch unit 32 connected to control the primary energizing circuit of the control transformer T from supply lines L₁L₂ and with a furnace relay 71 energized from the secondary transformer under the control of room thermostat 72 as indicated schematically in Fig. 3, the operation of the improved furnace air temperature responsive sequencing switch mechanism in controlling the operation of a warm air furnace is as follows:

When the furnace is not operating, the helical bi-metal element 16 will be at a sufficiently low temperature to bring operating arm 44 into engagement with the lever 55 and thereby positively move finger 56 into engagement with the pin 30a to effect the opening of the fan switch unit 30, as shown in the drawings. Under these conditions, the switch unit 31 will be in the low speed position and the limit switch unit 32 will be closed to enable the relay 71 to control the energizing circuit of the burner operating motor 74 from the supply lines L₁,L₂.

When room thermostat 72 closes its contacts to energize the operating winding of the relay 71 the relay contact 73 closes to energize the burner operating motor 74 and ignition apparatus to establish combustion in the furnace. As a result, the temperature of the furnace air to which the helical bi-metal element 16 is responsive will increase and element 16 will start rotation of the shafts 19 and 40 together with the calibrating dial 43 and all of the separately interlocked operating arms 44, 45, 46, and 47 in a counterclockwise direction. Assuming that the ranges of peripheral driving teeth 52, 53, and 54 of the calibrating dial 43 are initially calibrated by adjustment of plate 21 to the particular temperature values indicated in Fig. 1 and that the operating arms 44, 45, 46, and 47 have been selectively adjusted into their respective angular positions in which they are shown in Figs. 1 and 3, then as the furnace air temperature approaches 100° F. the arm 45 will engage with the biased differential lever 55 to move the finger 56 and pin 30a so as to relieve the tension of the switch biasing spring 76 that is maintaining the movable switch member 77 of the switch unit 30 in the circuit opening position against the closing bias of the magnet 78. When the furnace air temperature reaches 100° F. the closing bias provided by the magnet 78 will predominate over the opening bias of spring 76, thus effecting snap action movement of the pivoted switch member 77 to close the switch contacts 79. This establishes an energizing circuit for the warm air blower motor 70 extending from the supply line L₁ through the manual switch 90, conductor 91, switch contacts 79, conductor 92, the low speed contacts 93 of the speed changing switch unit 31, conductor 94, motor 70, and then through conductor 95 to supply line L₂. In this way the warm air blower motor 70 is started into operation at low speed when the temperature of the furnace air to which the helical bi-metal element 16 is subjected is above a predetermined minimum value that will not produce discomfort when circulated in the room. This value is predetermined by the selective adjustment of the operating arm 45.

As the temperature of the furnace air continues to rise due to continued operation of burner motor 74 the counterclockwise rotation of the dial plate 43 continues with both the radial plates 56 and 61, and also the cantilever cam finger 67, rotating freely in space in concentric paths. When the furnace air temperature reaches a value of 110 degrees as determined by the selective adjustment of operating arm 47, the cam finger 67 will engage with pin 31a and operate through the spring 96 to open the low speed contacts 93 and close the high speed contacts 97 with a snap action due to the combined action of magnets 98. This shifts the warm air blower motor 70 from the low speed to the high speed connection. The continued operation of the blower motor 70 at high speed should remove the heat from the furnace at a sufficiently high rate to prevent any excessive rise in temperature of the air passing through the furnace. In case, however, for some reason such, for example, as a dust plugged air filter or inadvertently closed outlet damper, the circulation of air through the furnace should become insufficient to carry away the heat as rapidly as it is generated in the furnace, then the furnace air temperature responsive operating element 16 will continue the counterclockwise rotation of the dial 43 until the operating plate 61 is brought into engagement with the pin 32a at 250° F. This will set up sufficient strain in the operating spring 100 to overcome the closing bias of magnet 101 and thereby effect separation of the furnace safety limit switch contacts 102 with a snap action. This breaks the energizing circuit of the burner motor 74 so as to stop operation thereof.

When the furnace air temperature returns below 250° F. after opening of the safety limit switch contacts 102, the calibrating dial 43 will be rotated by element 16 in a clockwise direction sufficiently to enable the closing bias of magnet 101 to predominate over the opening bias of spring 100 and thereby effect reclosure of contacts 102 with a snap action. This enables the burner motor 74 to be reenergized and the operation of the furnace to be continued.

When the room thermostat 72 opens its contacts to deenergize the relay 71 and stop operation of the burner motor 74, the operation of the warm air blower motor 70 will continue at high speed until the temperature of the furnace air to which the bi-metal operating element 16 is responsive begins to decrease. When the furnace air temperature decreases to a value below 110° F. by the amount of the differential of the speed changing switch unit 31, then the cam finger 67 will move away from the pin 31a sufficiently to permit the biasing spring 96 to return the low speed switch contacts 93 into engagement and open the high speed contacts 97. The low speed operation of the blower will continue the heat extraction from the furnace at a low rate thereby continuing to supply heat to the house over an extended period. However, when the continued operation of the fan at low speed has reduced the furnace air temperature to the minimum value of 80 degrees, the operating arm 44 will engage lever 55 and move finger 56 and pin 30a to build up a strain in biasing spring 76 sufficient to overcome the closing bias of magnet 78 and thereby effect opening of the switch contacts 79. This will stop operation of the blower motor 70.

The improved selectively adjustable separately interlocked calibrating connections of the present invention enable the starting and stopping of the fan to be selectively adjusted to occur substantially anywhere within the temperature range of 80 to 180 degrees by separate adjustment of the driven pins 48 and 49 of the operating arms 44, 45 into interlocking engagement with the driving teeth in range 52. Similarly, these improvements enable the shifting of the low to high speed positions of the blower substantially anywhere within the temperature range of 110 to 180 degrees by suitable adjustment of the driven pin 51 of the operating arm 47 into separate interlocking engagement with the driving teeth in range 54. Likewise, the improvements enable the opening and closing of the limit switch to be effected substantially anywhere within the temperature range of 150 to 250 degrees by the separate interlocking engagement of the driven pin 50 of arm 46 with the driving teeth in range 53. Still the selective relative adjustments of arms 44, 45, 46, and 47 are always limited and interlocked by the provision of the angular relative movement limiting fingers 60, 65 and 66 to insure that the change from low to high speed blower operation of the switch unit 31 must always occur after closure of the fan motor circuit by the switch unit 30 and the opening of the limit switch unit 32 must always occur after shifting from the low to the high speed fan operation. In this way, wide overlapping selective adjustment limits are provided with insurance of the proper sequence of operation of the switches since the finger 66 carried by the cam lever arm 47 prevents engagement of plate 56 with pin 30a while the cam 67 is in engagement with pin 31a, and the finger 65 prevents engagement of plate 61 with pin 32a while the cam 67 is disengaged from the pin 31a.

Since the oscillation range of the improved sequential control is dependent upon the variable dihedral angle between the convergent plates 56 and 61, and since the limits of this angle in turn are dependent upon the calibrating adjustment of arms 44 and 46, any excessive overtravel operation of the oscillation range by the bi-metal operating element 16 might damage the switch units 30 and 32 or other parts of the control. Hence the obtuse dihedral angle calibrating arms are provided with the stop lugs 44a and 46a for engagement with the fixed stop 37a that projects from side wall 37 of box 34. In this way, the rotation of dial 43 is limited within a variable oscillation range that is dependent upon the separate adjustments of the variable dihedral angle between the convergent plates 56 and 61 and any excessive overtravel of this variable oscillation range is positively stopped before any damage can be done.

In case only a single speed blower driving motor is employed, the two-speed switch 31 may be entirely eliminated together with the operating arm 47, and only the fan switch unit 30 and the furnace safety limit switch unit 33 employed. In this case, the operating arm 46 is provided with a bent-over adjustment limiting finger 105, as shown in Fig. 4, so as to engage with the operating arm 45 and thereby limit the relative movement therebetween.

What I claim as new and desire to secure by Letters Patent of the United States, is:

1. A temperature responsive control apparatus having in combination a helical bi-metal operating element, adjustable temperature calibrating means secured to one end thereof, a rotatable shaft extending centrally through said helical operating element and secured to the other end thereof, a stub shaft removably secured to one end of said shaft, a plurality of lever arms rotatively mounted in nested abutting sliding relation on said stub shaft and provided with axially extending portions adapted for adjustable relative movement, a calibrating dial fixed on said stub shaft and having a plurality of separate ranges of driving teeth formed in the periphery thereof in overlapping temperature calibration, each of said lever arms having an axially extending yoke portion straddling the periphery of said dial and provided with a radially removable driving pin biased into selective meshing engagement with a predetermined range of said driving teeth for separately gearing said lever arm in calibrated driving relation with said dial and for limiting the adjustment of a pair of said arms within one of said ranges and each of the other of said arms within different corresponding ranges, a plurality of snap action switch units, one having operating means including a lever extending into the paths of said pair of arms and biased towards one of said pair of arms for adjustable differential operation thereby and each of the other of said units having operating means extending into the path of an axially extending portion of a corresponding one of said other arms for operation thereby, and interlocking fingers extending axially from a plurality of said arms into the path of an adjacent arm for limiting the adjustable relative movement of said arms to effect sequential operation of said switch units.

2. A condition responsive control apparatus having in combination an operating shaft, a calibrating dial fixed thereon and having a calibrated range of driving teeth formed in the periphery thereof, a pair of arms rotatively mounted on said shaft for adjustable relative movement and provided with spring latch means for interlocking engagement with said teeth, condition responsive means for oppositely rotating said shaft through said calibrated range, and a snap action switch biased to one position and having an operating lever rotatably mounted on said shaft and extending between said pair of arms for adjustable differential operation thereby, and biasing means carried by one of said arms for biasing said lever toward the other of said arms.

3. A condition responsive control apparatus having in combination operating means responsive to opposite variations in a condition, a movable calibrating member reversely operated by said means and provided with a calibrated range of driving elements, a pair of selectively adjustable members provided with spring latch means for interlocking engagement with said elements, and differential control means having a biased operating member extending between said pair of members for adjustable differential operation thereby.

4. Condition responsive switching apparatus having, in combination, a rotatable calibrated driver, means for oscillating said driver in response to opposite variations in a condition, a trio of rotatable lever arms coaxial with said driver, one provided with an arcuate cantilever cam and having an angularly adjustable interlocking connection with said driver to oscillate said cam in calibrated relation therewith, a switch having an operating pin extending into the path of said cam for engagement therewith, the others of said lever arms each carrying a radial plate in a path concentric with the oscillation path of said cam and each having a separate angularly adjustble interlocking connection with said driver to oscillate the corresponding plate in calibrated relation therewith and each provided with stop means for variably limiting the oscillation range of said driver, a pair of switches having separate operating pins, each tangentially extending into the oscillation path of a corresponding one of said plates for engagement therewith, and stops carried by said cam lever arm for limiting the relative angular adjustment of said interlocking connections to prevent engagement of one of said plates with the corresponding switch operating pin while said cam is in engagement with the corresponding switch operating pin and to prevent engagement of the other of said plates with the corresponding switch operating pin while said cam is disengaged from the corresponding switch operating pin.

5. Condition responsive switching apparatus having, in combination, a driving element oscillated responsively to opposite variations in a condition, a trio of coaxial rotatable angularly relatively adjustable members driven thereby, one provided with an arcuate cantilever cam, a switch having an operating pin extending into the path of said cam for engagement therewith, each of the other of said driven members carrying a plate in a path concentric with the path of said cam, a pair of switches having separate operating pins, each tangentially extending into the path of a corresponding one of said plates for engagement therewith, and interlocking means for limiting the relative angular adjustment of said members to prevent engagement of a predetermined one of said plates with the corresponding switch operating pin while said cam is in engagement with the corresponding switch operating pin and to prevent engagement of the other of said pair of plates with the corresponding switch operating pin while said cam is disengaged from the corresponding switch operating pin.

6. Condition responsive switching apparatus having, in combination, a rotatable driving and calibrating member, means for oscillating said member in response to opposite variations in a condition, a rotatable cantilever cam coaxial with said member and having an adjustable driving connection therewith, a switch having an operating pin extending into the path of said cam for engagement therewith, a pair of axially convergent rotatable plates concentric with said cam and coaxial with said member and having separately adjustable driving connections therewith to jointly rotate said plates with said cam, and a pair of switch operating pins, each tangentially extending into the path of a corresponding one of said plates for engagement therewith.

7. Switching apparatus having, in combination, a pair of switch units in side-by-side alignment and having separate operating pins sliding in aligned parallel paths, a third switch unit in spaced apart opposing alignment with said pair of units and having an operating pin sliding in a path extending parallel with and intermediate said parallel paths, means including a driving member oscillatable about an axis normal to the plane of said paths and intersecting said intermediate path and having a cantilever cam extension adjustably connected for oscillation therewith to operate the corresponding switch operating pin sliding in said intermediate path and having a pair of axially convergent plates adjustably connected separately therewith for oscillation in paths concentric with the path of said cam extension to separately operate the other of said switch operating pins.

8. Switching apparatus having, in combination, a trio of switches having separate operating pins sliding in parallel planar paths, and means including a driving member oscillatable about an axis normal to the plane of said paths and intersecting the intermediate one of said paths and having a cantilever cam adjustably connected for oscillation therewith to operate the corresponding switch operating pin sliding in said intermediate path and having a pair of axially convergent plates adjustably connected separately therewith for oscillation in paths concentric with the path of said cam to separately operate the other of said switch operating pins.

9. A condition responsive control having, in combination, a plurality of coaxial separately angularly adjustable lever arms, each provided with an axial extension and said extensions being aligned for movement in concentric paths, condition responsive means for jointly oscillating said arms through a variable range and provided with a separate adjustable coupling for reversely driving each of said arms, and a plurality of snap action switches having separate operating pins sliding in parallel paths in a plane normal to the axis of said lever arms and alternately extending tangentially and radially into the path of corresponding extensions for operation thereby.

10. In combination, a trio of control devices each provided with an endwise sliding operating pin having reciprocating movement in a path parallel and planar with the paths of the other pins, a condition responsive operator having a trio of coaxial angularly adjustable operating members jointly rotatable in concentric paths, each into operating engagement with a corresponding one of said pins, and interlocking means for limiting the relative angular adjustment of said members to prevent engagement of one of said members with the corresponding pin while a second one of said members is in engagement with the corresponding pin and to prevent engagement of the third one of said members with the corresponding pin when said second member is disengaged from the corresponding pin.

11. Switching apparatus including, in combination, a pair of switches having separate endwise sliding operating pins in parallel alignment, a pair of coaxially rotatable axially convergent plates having an oscillating coaxial driving member provided with adjustable connections for separately driving each plate to vary the dihedral angle therebetween and having the axis of said plates extending between said pins and normal to the plane thereof for effecting normal abutting engagement of each plate separately with the end of a corresponding switch operating pin upon oscillation of said driving member, and stop means adjustable in accordance with the dihedral angle between said plates for limiting the oscillation of said driving member.

12. Switching apparatus including, in combination, a pair of switches having separate endwise sliding operating pins in parallel alignment, and a pair of jointly rotatable axially converging plates, each having means for adjusting the dihedral angle therebetween and having the axis thereof extending between said pins and normal to the plane thereof for effecting substantially tangential normal abutting engagement of each plate separately with the end of a corresponding switch operating pin.

GEORGE M. HAUSLER.